United States Patent Office 2,789,769
Patented Apr. 23, 1957

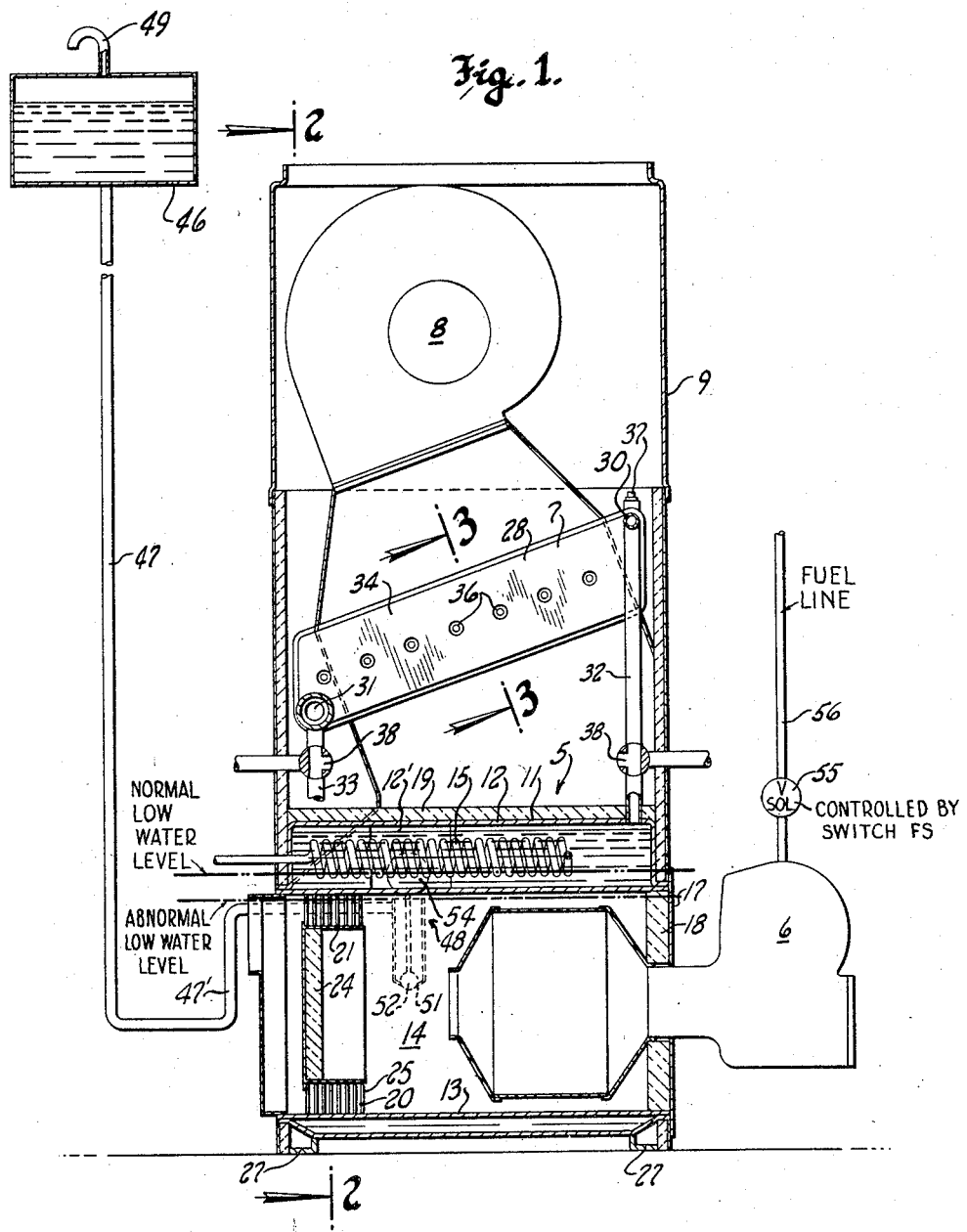

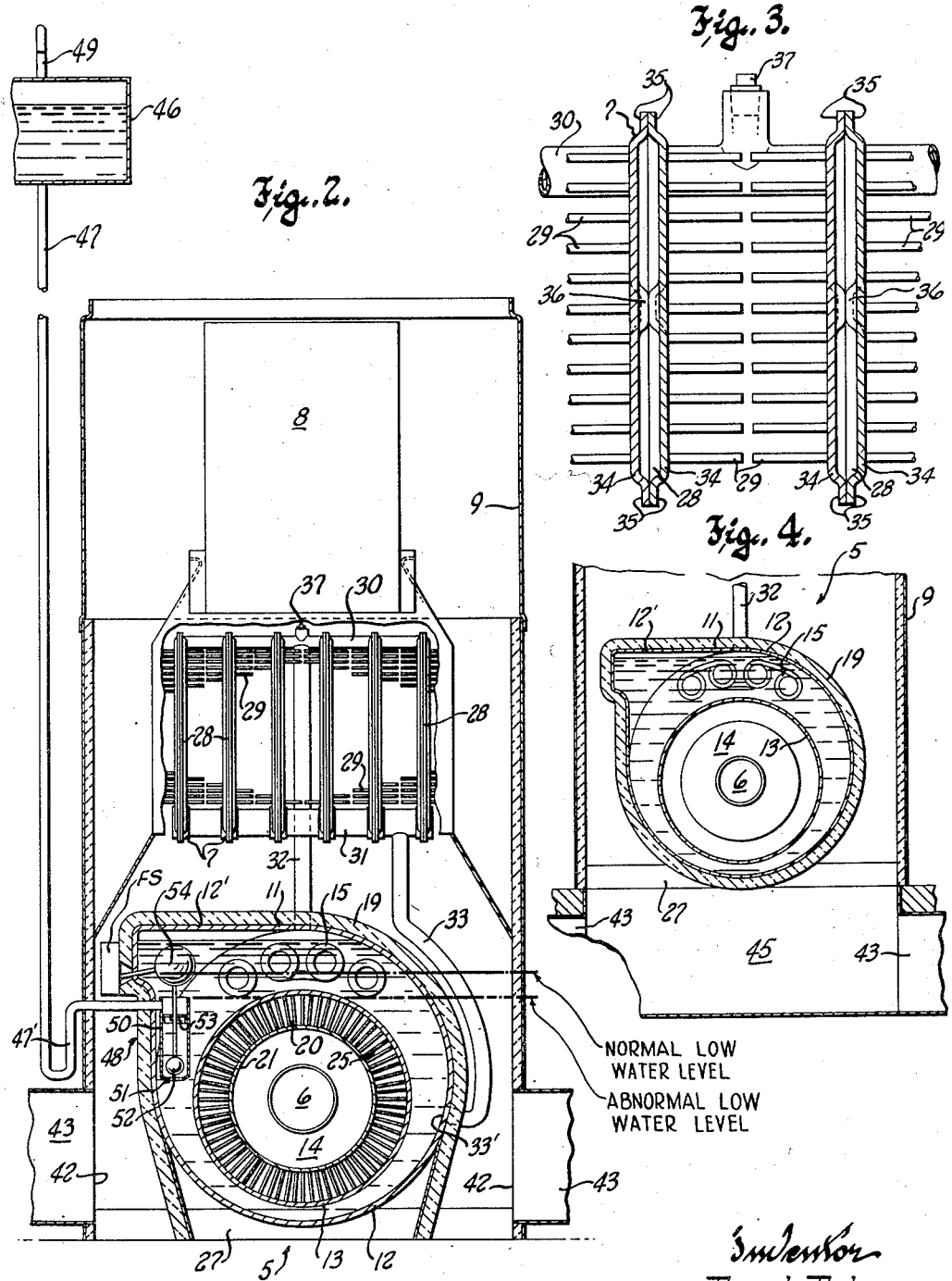

2,789,769

COMBINED AIR AND WATER HEATER

David Dalin, Inglewood, Calif., assignor to A/B Svenska Maskinverken, Sodertalje, Sweden, a corporation of Sweden Application March 30, 1955, Serial No. 497,871

6 Claims. (Cl. 237—17)

This invention relates to improvements in domestic heating equipment and refers more particularly to improvements in combination hot air and domestic water heating units of the general type shown and described in my copending patent application, Serial No. 325,383, filed December 11, 1952.

Heating units of the type shown and described in said copending application have the important advantage of providing both hot water for domestic use and heated air for space heating in the quantities in which those media are required, heat from a source thereof being automatically proportioned to the two media in accordance with the demand for each of them. Thus, for example, when there is no demand for space heating all of the available heat from the source can be used for producing hot water in response to a greater demand therefor; and vice versa, when there is no demand for hot water all of the available heat can be used to heat the air to quickly raise the temperature in the living quarters or other space to be heated.

The present invention has for one of its objects the provision of a combined hot air and domestic water heating unit of the character described which is especially well adapted for installation in basementless houses where the heating plant is situated in a utility room or the like and the heated air outlet is either at the bottom or the top of the housing enclosing the unit, depending upon the character of the installation. Since such a unit should occupy a minimum of floor space, it is a further object of this invention to combine the means for heating the air and water in a manner which takes full advantage of the highly efficient extended surface of Patent No. 2,469,635 issued to David Dalin et al. on May 10, 1949, and thereby achieves unprecedented compactness.

Another object of this invention resides in the provision of heating apparatus of the character described which utilizes the high heat content inherent in vaporized heat exchange fluid to thus achieve further compactness in a unit for heating both air and water for domestic use. More specifically, it is another object of this invention to provide heating apparatus of the character described wherein large volumes of air and/or hot water for domestic use may be heated by indirect heat exchange with vaporized fluid heat exchange medium generated in a small boiler. In the apparatus of this invention these objectives are achieved by using water as a heat exchange medium and heating it by indirect heat exchange with a heat source to thus generate steam which is passed in indirect heat exchange relation with the air and water to be heated, thereby taking advantage of the high heat energy present in the steam in the form of latent heat of vaporization.

Another object of this invention resides in the provision of apparatus of the character described wherein steam is used as a heat transfer medium for heating both air and domestic hot water during periods of relatively great heat demand, to attain the objectives set forth above, while hot water is used as the heat transfer medium during periods of low heat demand.

While the foregoing object is achieved in certain embodiments of the invention of my aforesaid copending application, those devices had one very serious disadvantage in that the primary and secondary heat exchangers, and the communicating ducts between them, had to be hermetically sealed, since a drop in temperature below the steaming temperature corresponding to the prevailing atmospheric pressure resulted in a pressure drop inside the heat exchangers which, in the absence of hermetic sealing would induce air leakage into the exchangers. The secondary heat exchanger, in which heat was given off to air to be heated, was located directly above the primary heat exchanger, wherein boiler water was heated, and either steam or hot water (depending upon prevailing operating conditions) rose from the primary heat exchanger into the secondary heat exchanger by natural circulation. To permit generation of steam even at sub-atmospheric pressures, and to prevent the possibility of air locks, the air had to be evacuated from the space above the liquid level. The presence of any air in this space would seriously interfere with the generation of steam and any resulting air lock would render sections of the heat exchanger ineffective. Under such conditions the unit would not provide adequate heat output.

By contrast, it is an object of the present invention to provide apparatus of the character described wherein an above-atmospheric pressure will at all times prevail in the superimposed primary and secondary heat exchangers, thereby eliminating the necessity for an absolutely perfect hermetic sealing of these units.

Another object of this invention, achieved by the elimination of the need for the removal of all air from the space in the top of the secondary heat exchanger, resides in the provision of apparatus of the character described wherein the secondary heat exchanger may be entirely filled with hot water during periods of low demand for air heating as for instance during mild spring and fall weather, and still achieve sufficient heat radiation therefrom, and wherein the secondary heat exchanger may be wholly or partially filled with steam during periods of high heat demand to utilize the higher temperature and large latent heat of steam.

Another object of this invention resides in the provision of apparatus of the character described wherein heat transfer to air and domestic water to be heated will be efficiently accomplished by reason of the fact that the primary and secondary heat exchangers operate at above-atmospheric pressure, and consequently at higher temperatures than would prevail if atmospheric or below-atmospheric pressures were maintained, while at the same time such pressures can not become dangerously high for a plant intended for domestic use.

Still another object of this invention is to provide a unit of the character described which is so designed and constructed that without requiring adjustment of any diverting dampers the blower of the unit can be used to discharge air modified in any desired way into the living quarters, control of the output of the unit requiring merely the adjustment of two valves by which the secondary heat exchanger may be selectively connected with or disconnected from either the primary heat exchanger or a source of cooling fluid such as cold water, or may be entirely disconnected from both.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate a complete example of the physical embodiment of the invention constructed according to the best mode so far devised for the practical application of the principles thereof, and in which:

Figure 1 is a vertical sectional view of a combination hot air and domestic water heating unit embodying the principles of this invention, and in which the hot air outlets are above the floor upon which the unit sets;

Figure 2 is a vertical sectional view taken on the plane of the line 2—2 of Figure 1;

Figure 3 is a fragmentary sectional view taken on the plane of the line 3—3 in Figure 1; and Figure 4 is a fragmentary vertical sectional view taken through the combustion chamber and illustrating an arrangement which may be employed when the hot air outlets are to be located beneath the floor upon which the unit sets, as would be the case where the entire unit is situated in the attic.

Referring now more particularly to the accompanying drawings in which like numerals designate like parts throughout the several views, the combined hot air furnace and domestic hot water heater of this invention comprises, in general, a primary heat exchanger or boiler designated generally by the numeral 5 and in which heat exchange fluid is heated from a heat source comprising a fuel burner 6; a secondary heat exchanger or radiator 7; an air blower 8 mounted above the secondary heat exchanger for blowing air downwardly across the secondary heat exchanger; and a housing 9 enclosing the apparatus.

The primary heat exchanger or boiler is a substantially annular tank 11 comprising an outer cylindrical wall 12 and an inner cylindrical wall 13 which also defines a combustion chamber 14. The axes of the two cylindrical walls defining the annular primary heat exchanger are disposed horizontally, but they do not coincide, the axis of the inner wall being spaced below (but parallel to) that of the outer wall, so as to provide more cross sectional area in the tank above than below the combustion chamber, to thus accommodate a secondary heat exchanger 15 comprising water heating coils mounted above the combustion chamber. It will be understood that the outer tank wall 12 need not be cylindrical but may have an ovoid cross section to provide additional space above the combustion chamber for the water heating coils, and in fact has an enlargement 12' at one side to provide space for a purpose to be described.

The fuel burner 6, which may be of any known type, but is preferably one that operates on liquid or gaseous fuel, is mounted in the combustion chamber, and the end wall 17 of the combustion chamber, through which the burner unit projects, is preferably provided with a liner 18 of refractory material. Operation of the burner is controlled by the usual room thermostat (not shown) mounted in the space to be heated, a boiler thermostat (also not shown) responsive to the temperature of the boiler fluid, and by a float switch FS which shuts off the burner when the water in the boiler drops below the normal low water level.

At its end opposite the burner the combustion chamber has an outlet provided by an annular flue gas duct 20. This duct is coaxial with the combustion chamber and is defined by a cylindrical passage-defining wall 21 which is radially spaced inwardly from the inner cylindrical tank wall. The central aperture defined by the passage-defining wall 21 is blocked, as by a transverse refractory lined wall 24, to constrain hot gases from the combustion chamber to flow through the annular flue gas duct. Extended surface 25 on the portion of the inner cylindrical tank wall which defines the flue gas duct, of the type described in the aforesaid patent to David Dalin et al., No. 2,469,635, effects an extremely efficient transfer of heat from the flue gases to water in the annular tank surrounding the combustion chamber and flue gas duct.

Suitable mounting supports 27 extend across the ends of the boiler. For reasons which will appear hereinafter, the primary heat exchanger tank is preferably covered with a suitable insulation 19.

The secondary heat exchanger or radiator 7 is disposed directly above the boiler and, as best seen in Figures 2 and 3, comprises a bank of elongated, shallow compartments 28 mounted in side-by-side relation to one another. These several compartments or radiator sections have their flat sides disposed generally parallel to the axis of the combustion chamber, and have their interiors communicated with one another by an upper header 30 and a lower header 31. The upper header is communicated by means of a duct 32 with the top of the boiler, to provide a hot water and/or steam inlet to the radiator, and another duct 33, communicating the lower header with the boiler, has its mouth 33' near the bottom of the boiler to provide a cold water or condensate return. Air blown across the radiator by the blower abstracts heat from the hot water and/or steam in the radiator at a rate sufficient to maintain a relatively fast natural circulation therethrough because the several compartments or radiator sections 28 are provided at their exteriors with extended surface 29 of the type described in the aforesaid patent to David Dalin et al. No. 2,469,635.

Each compartment or section of the radiator comprises a pair of dished walls 34 (see Figure 3) having mating flanges 35 around their exteriors disposed flatwise adjacent and welded or otherwise bonded together. Oppositely disposed dimples 36 in the two walls cooperate to provide spacers which maintain the shape of the radiator sections. A plug 37 in the upper header permits air to be vented out of the top of the radiator when the furnace is initially put into operation, so that during periods when the secondary heat exchanger is operating as a hot water radiator it may be completely filled with water.

It will be understood that air heating is effected in consequence of the circulation of air across the radiator 7 by means of the blower 8. This blower may be controlled in any desired manner, as for example by means of the room thermostat (not shown) which, as noted hereinbefore, also controls the burner, the arrangement being such that the burner is turned on only when the boiler temperature as sensed by the boiler thermostat is below a predetermined minimum. The blower may be so used in warm weather for air cooling, since the radiator inlet and return ducts 32 and 33 are provided with two-way valves 38 whereby circulation of heated fluid through the radiator from the boiler may be disrupted and cold water from a source thereof may be circulated through the radiator to absorb heat from the air blown across it. The insulation 19 covering the primary heat exchanger prevents radiation of heat from it to the cooled air passing thereacross from the radiator during such warm weather operation.

The housing 9 comprises a sheet metal shell which extends above the blower to enclose it as well as the heat exchangers and has its top open to provide an air inlet. Obviously a filter (not shown) may be mounted in the inlet. The housing provides a duct surrounding the heat transfer device whereby air from the blower is constrained to flow directly through the radiator, downwardly across the boiler, and to one or more outlets 42 at the bottom of the housing, directly above the floor or surface on which the unit is mounted. These outlets may be connected with ducts 43 through which heated air can be distributed to different rooms, or may afford a direct outlet for the air into the space to be heated. Alternatively, as shown in Figure 4, the unit may be mounted above a chamber 45 recessed in the floor and into which the housing opens directly downwardly (the housing having no bottom) and from which ducts 43 extend under the floor. In this alternative form the apparatus may also be mounted in an attic.

In a sense the boiler and the radiator comprise a unitary heat transfer device by means of which heat from the burner is transferred (via the fluid in the boiler) to air being circulated across the radiator and water being circulated through the heating coil 15, and thus the boiler may be considered a heat absorbing section of this heat transfer device while the radiator 7 and the heating coil constitute the heat dissipating sections thereof.

An important feature of this invention is the provision of an expansion vessel 46 mounted a substantial distance above the boiler and connected therewith below its water line by a duct 47. As will be later described, the connection, designated generally by the numeral 48, between the duct 47 and the boiler not only assures communication between the expansion vessel and the boiler below the water level therein but also locates the actual point of communication during normal operation near the bottom of the boiler where the temperature of the water in the boiler is lowest. The expansion vessel is vented to the atmosphere at its top, as by means of a port 49, so that the level of water in the vessel can rise and fall with changes in steam pressure in the boiler.

The height of the expansion vessel above the boiler thus determines the pressure in the boiler. Hence the elevation of the expansion vessel should be such that the weight of the water column it provides, balances the maximum pressure at which the boiler is to operate.

It is important to note that the duct 47 is formed with a return bend 47' below its connection with the boiler, to provide a water trap to prevent steam from being blown into the expansion chamber in the event the water level drops below its intended lowest level.

The connection 48 between the duct 47 and the boiler is in the enlargement 12' of the boiler and comprises an upright open ended tube 50 connected between its ends with the mouth of the duct 47. The lower end of this tube 50 has a valve seat 51 therein adapted to be engaged by a valve 52. A stem extending up from the valve and slideably guided in a spider 53 in the upper end of the tube 50 connects the valve with a float 54 which rises and falls with the water level in the boiler. The float is connected with the float switch FS to hold the same closed as long as the water level is above the normal low and to open the switch whenever the water level drops below the normal low.

As long as the water level in the boiler is above the normal low, the float 54 holds the valve 52 off its seat so that communication between the boiler and expansion tank is through the bottom of the tube 50 as well as the top thereof. This assures against the influx of colder water from the expansion tank into the upper much hotter strata of water in the boiler during periods of dropping boiler pressure and as long as the water level is above the normal low.

When the water level in the boiler reaches normal low and drops below this level, the descent of the float engages the valve 52 with its seat and closes off communication between the boiler and the bottom of the tube 50, but without disrupting communication through the top of the tube 50. Hence upon a decrease in pressure in the boiler from that which caused the depression in water level, the water in the expansion tank and duct 47 may flow into the boiler despite the closure of the bottom end of the tube; and as soon as the water level is restored to normal low the float rises and unseats the valve 52 so that thereafter the water returning to the boiler from the expansion vessel enters it near the bottom of the boiler.

The float switch FS has the function of shutting off the burner in the event the water level drops below its normal low. It may do this in any suitable way as by shutting off the supply of fuel to the burner by means of a solenoid valve 55 in the fuel line 56. The float switch thus serves as a safety device to prevent the boiler being boiled dry because of some failure in the burner controls to shut off the burner.

It will be understood that the amount of water in the boiler at the normal low level is—as indicated—high enough to keep the float switch FS closed.

Operation

Assuming that the water in the boiler is hot and in fact that the radiator 7 is filled with steam, a call for heat at the room thermostat will first turn on the blower 8 and cause air to be circulated over the radiator. If this demand for heat is satisfied by this circulation of air over the radiator, the room thermostat merely shuts off the blower, but if it is not, the drop in temperature of the boiler fluid caused by the abstraction of heat therefrom by the circulating air will cause the boiler thermostat to close and turn on the burner.

During the abstraction of heat by the air being heated the pressure in the boiler of course drops and as a result the water level in the boiler rises due to the water entering it from the expansion chamber; and when the burner begins to operate steam is generated and the water level in the boiler drops because of the increased pressure in the system. However, no matter what the situation may be at any given instant, there is always a positive pressure in the boiler and radiator, the maximum value of which is dependent upon the height of the expansion vessel above the boiler and the level of the upper end of the tube 50; and since this pressure cannot exceed the pressure head of the water in the expansion tank, the unit cannot operate at a dangerously high pressure. Nor can the water level in the boiler drop below the top of the tube 50.

The demand for heat to maintain the desired temperature of the domestic hot water turns on the burner when needed. Hence, even in warm weather this unit operates to maintain a supply of hot water for domestic use.

During periods of high heat demand when the burner is in operation, steam will be generated and rise into the radiator 7 and perhaps fill the same and depress the water level in the boiler by forcing the water up into the expansion vessel, but during periods of low heat demand, as in mild weather or in summer when space heating is not required, the boiler thermostat may be set to maintain a temperature somewhat less than the steaming temperature corresponding to the pressure at the water level in the boiler or radiator 7.

From the foregoing description taken together with the accompanying drawings, it will be readily apparent that this invention provides a combined hot air furnace and domestic water heater which employs a small boiler to generate either steam or hot water, depending upon heat demand, to achieve unusual efficiency and compactness, and which, while operating at above-atmospheric boiler pressure affords great safety together with very low cost.

What I claim as my invention is:

1. In a combined hot air furnace and domestic water heater of the type having a primary heat exchanger in which heat exchange fluid is heated by indirect heat exchange with heat from a source thereof and having a secondary heat exchanger above the primary heat exchanger and communicated therewith, across which air to be heated may be blown to absorb heat from the heated fluid; means for at all times maintaining above-atmospheric pressure in said heat exchangers and for forcing liquid heat exchange fluid into the secondary heat exchanger as vaporized heat exchange fluid is condensed therein during periods of low heat demand, said means comprising an expansion vessel containing liquid heat exchange fluid and spaced a substantial distance above the secondary heat exchanger and a duct communicating the expansion vessel with the interior of the primary heat exchanger below a predetermined liquid level in the primary heat exchanger, said expansion vessel being vented at its top.

2. A combination hot air furnace and domestic water heater of the type comprising a boiler wherein heat transfer fluid is heated by indirect heat exchange with a heat source, a coil in said boiler through which water for domestic use is circulated to be heated by indirect heat exchange with heated heat transfer fluid, and a secondary heat exchanger through which heat transfer fluid from the boiler may be circulated to heat air circulated thereacross by indirect heat exchange: characterized by the fact that the secondary heat exchanger is located at a level above the boiler so that partially or wholly vaporized heat transfer fluid may rise into the secondary heat exchanger from the boiler during periods of high heat demand; and further characterized by an expansion vessel spaced above the secondary heat exchanger and communicated with the interior of the boiler by means of a duct having its mouth below a predetermined liquid level in the boiler, said expansion vessel containing liquid heat transfer fluid and being vented at its top to maintain above atmospheric pressure in the boiler and the secondary heat exchanger and to force liquid heat transfer fluid into the secondary heat exchanger from the boiler as vaporized heat transfer fluid is condensed therein during periods of low heat demand.

3. The combination hot air furnace and domestic hot water heater of claim 2, further characterized by the fact that the duct communicating said expansion vessel with the boiler has a substantially U-shaped portion therein with the bight of the U substantially below the lowest level attainable by liquid heat transfer fluid in the boiler to provide a liquid trap by which vaporized heat transfer fluid in the boiler is prevented from rising into the expansion vessel.

4. The combination hot air furnace and domestic hot water heater of claim 2, further characterized by the fact that the coil in which the water for domestic use is heated is so located in the boiler as to be above the normal low liquid level in the boiler so that during periods of high heat demand said coil is heated essentially by vaporized heat transfer fluid.

5. In a combination hot air furnace and domestic water heater of the type comprising a boiler wherein heat transfer fluid is heated by indirect heat exchange with a heat source, a coil in said boiler through which water for domestic use is circulated to be heated by indirect heat exchange with heated heat transfer fluid, and a secondary heat exchanger located at a higher level than the boiler and having its interior communicated with the boiler so that vaporized heat transfer fluid rises into the secondary heat exchanger during periods of high heat demand, means for preventing the development of sub-atmospheric pressure in the boiler and secondary heat exchanger during periods of low heat demand when the heat transfer fluid is substantially all condensed, said means comprising: an expansion vessel spaced above the secondary heat exchanger and vented at its top; and a duct communicating the expansion vessel with the interior of the boiler and having its mouth below a predetermined liquid level in the boiler, the expansion vessel and said duct containing liquid heat transfer fluid so that liquid heat transfer fluid will be forced from the boiler into the secondary heat exchanger as vaporized heat transfer fluid is condensed therein during periods of low heat demand, said duct having a substantially U-shaped portion with the bight of the U disposed substantially below the lowest level attainable by liquid heat transfer fluid in the boiler to provide a liquid trap by which vaporized heat transfer fluid from the boiler is prevented from rising into the expansion vessel.

6. The apparatus of claim 4 further characterized by the fact that said duct communicates with the interior of the boiler through an imperforate upright tube disposed within the boiler below the normal low liquid level and providing vertically spaced apart mouths at the top and bottom thereof, so that liquid from the duct will normally enter the boiler through the bottom mouth of said tube and will therefore not mix directly with the hottest liquid in the boiler; and further characterized by a float controlled valve for blocking the bottom mouth of said tube when heat transfer liquid in the boiler falls below a predetermined level, so that said duct will then be communicated with the boiler only through the upper mouth of the tube.

References Cited in the file of this patent

UNITED STATES PATENTS

| 1,980,688 | Lewis | Nov. 13, 1934 |
| 2,129,202 | Drewry | Sept. 6, 1938 |
| 2,159,284 | Miller | May 23, 1939 |
| 2,247,060 | Levine et al. | June 24, 1941 |